2,729,640

Patented Jan. 3, 1956

2,729,640

HYDROXY-ISO-MELAMINE

Donald W. Kaiser, Hamden, Conn., and John J. Roemer, Tamaqua, Pa., assignors to American Cyanamid Company, New York, N. Y., a corporation of Maine No Drawing. Application May 9, 1955,
Serial No. 507,140

5 Claims. (Cl. 260—249.6)

The present invention relates to a new composition of matter, hydroxy-iso-melamine, and to a method for its preparation.

The hydroxy compound of the present invention can be represented by the structural formula

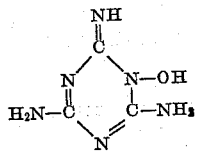

or as a tautomer thereof.

Preparation of this new compound can be accomplished by treating dicyanoguanidine with hydroxylamine, preferably in an inert solvent. It is also preferable to utilize the reactants in the form of their salts, e. g. as an alkali metal dicyanoguanidine and as a hydroxylamine salt such as the sulfate, hydrohalide, nitrate, phosphate, acetate, or the like. It is notable that the proportion of reactants used is not critical. Neither does any particular advantage result from using either in excess. Reaction will occur simply on mixing the reactants in the solvent at ambient temperature. Moreover, the temperature is not critical, as some of the desired product is obtained at temperatures as low as 0° C., and lower, and as high as 100° C., and higher. As the reaction is exothermic, initial mixing is conveniently carried out at some 15°–30° C., thereafter permitting the heat of reaction to warm the reaction solution to 40°–70° C. or to reflux, thereby utilizing the exotherm to accelerate the reaction.

Any of a number of available inert solvents can be used. The glycol mono and dialkyl ethers have been found satisfactory. Other suitable menstrua include aqueous solutions of dioxane, acetone, and the lower alkanols, and the like. For example, a 50% ethanol-water mixture is quite satisfactory.

Preparation of the new compound of the present invention may be illustrated by the following example which is intended for that purpose only and not by way of limitation.

Example I

Potassium dicyanoguanidine (73.5 g.—0.5 mole), hydroxylamine hydrochloride (34.8 g.—0.5 mole) and 600 ml. of glycol mono ethyl ether (Cellosolve) are placed in a 1-liter three necked flask equipped with a stirrer, thermometer and reflux condenser. On stirring, the resultant liquor (initially at room temperature) becomes heated and the temperature rises to about 53° C., in 25 minutes. During this time the desired product separates as a white flocculent precipitate. The reaction is substantially complete at this point. To consume any small amounts of reactants remaining, the reaction mixture is heated on a steam bath for a few minutes, then cooled and filtered. The precipitate of crude hydroxy-iso-melamine is collected and warmed in 150 ml. of water, filtered and washed with 100 ml. of water to remove by-product potassium chloride. The yield of dried triazine product is 65 grams (91.5% theory). After recrystallization from water the product is found to decompose at 323–325° C.

One additional fact concerning the reactants used is notable. Dicyanoguanidine, U. S. Patent 2,371,100, was originally considered to be 1,3-dicyanoguanidine of the formula:

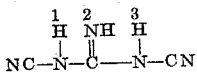

which suggests that the free acid dicyanoguanidine should be dibasic. Monobasic salts, e. g., potassium dicyanoguanidine, which might be named 1-potassium, 1,3-dicyanoguanidine by the original nomenclature. Up to the present time, however, no dibasic salts of dicyanoguanidine have been prepared. Therefore, it is believed that dicyanoguanidine, as prepared in above Patent 2,371,100, is best represented as an unsymmetric structural tautomer of the symmetrical form, thus:

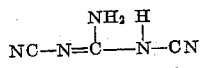

The potassium salt of this monobasic acid would thus be best represented by the formula:

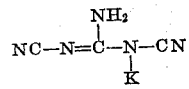

or (identically) as

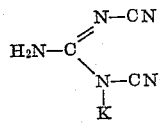

the latter being named preferably 1-potassium, 1,2-dicyanoguanidine. Accordingly, dicyanoguanidine as mentioned in this specification refers to the compound prepared by the procedure of U. S. Patent 2,371,100, there named 1,3-dicyanoguanidine, but which is probably preferably named as the tautomer 1,2-dicyanoguanidine. The conjectural 1,1-dicyanoguanidine isomer is not presently known to exist.

The new compound of the present invention can be used similarly to melamine or ammeline in resin and plastic formulation, and the like. It is also useful as an intermediate in the preparation of dyes, pharmaceuticals, ion exchange resins, and as a nitrogen additive to ferrous metals. In addition, it has the important virtue of preventing the appearance of tarnish on silver and silver alloys when the latter are washed with commercial dishwashing detergents. This is shown in the following example which again is illustrative only.

Example II

A test solution is prepared containing 1.65 gms. per liter of a commercially obtained detergent, containing about 50% sodium tripolyphosphate, 28% alkyl-aryl sulfonates, 15% sodium sulfate, 3.5% sodium silicate, 3.5% moisture and a small amount of sodium chloride, and divided into two portions. One is untreated, in the other there is dissolved about one per cent of hydroxy-iso-melamine obtained as in Example I. Test samples of nickel-silver are immersed in each for seven minutes at about 42° C. After removal and water-washing the metal samples from the untreated solution are tarnished, those from the solution containing the hydroxy-iso-melamine are not.

The present application constitutes a continuation in part of our co-pending application, Serial No. 356,601, filed May 21, 1953 (now abandoned); which in turn was co-pending with and a continuation in part of our application Serial No. 303,606, filed August 9, 1952, now abandoned.

What we claim is:

1. Hydroxy-iso-melamine having the formula:

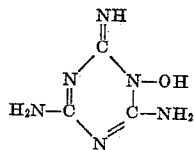

2. The method of preparing hydroxy-iso-melamine that comprises subjecting a dicyanoguanidine tautomer of the group consisting of:

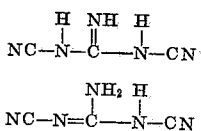

to the action of hydroxylamine in an inert solvent.

3. The method of preparing hydroxy-iso-melamine that comprises subjecting an alkali metal dicyanoguanidine tautomer of the group consisting of:

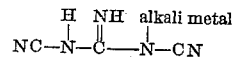

and

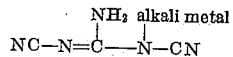

to the action of a hydroxylamine salt in an inert solvent at a temperature in the range of about 0°–100° C.

4. The method of preparing hydroxy-iso-melamine that, comprises reacting a potassium dicyanoguanidine tautomer of the group consisting of

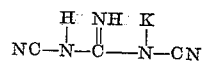

and

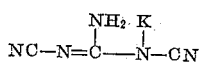

with hydroxylamine hydrochloride in a glycol mono ether.

5. The method according to claim 4 in which the ratio of reactants is substantially equimolar, and in which the reaction temperature is that autogenously produced by the heat of reaction.

No references cited.